Patented June 2, 1931

1,807,761

UNITED STATES PATENT OFFICE

EDUARD SPRÖNGERTS, OF WIESBADEN-BIEBRICH, GERMANY, ASSIGNOR TO KALLE & CO. AKTIENGESELLSCHAFT, OF WIESBADEN-BIEBRICH, GERMANY

PROCESS OF IMPROVING THE RESISTANCE OF DIAZO-TYPES TO WATER

No Drawing. Application filed July 19, 1929, Serial No. 379,585, and in Germany July 30, 1928.

The present invention relates to a process of improving the resistance of diazo-types to water.

Many of the diazo-types produced according to the known processes are not sufficiently resistant to water. This deficiency manifests itself especially when the dyestuffs produced upon the bases are containing a sulfo or a carboxyl group.

I have now found that said diazo-types can be made completely resistant to water, or that their fastness to water can be considerably increased, if the diazo-types are prepared by means of an aryl derivative of guanidine of the following general formula:

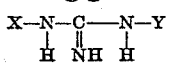

wherein X stands for an aryl residue and Y for H, the group

or an aryl residue.

The process can be carried out in such a manner that the base, which serves as a carrier of the layer of the picture, is subjected to a preliminary treatment with a solution of aryl guanidine or aryl biguanidine. It is however, more convenient to add an aryl guanidine or an aryl biguanidine already to the light-sensitive layer. If it is intended to produce the diazo-type by a wet process, an aryl guanidine or an aryl biguanidine may be added to the developing liquids. The light-sensitive layers may, of course, also contain any admixtures, such as a stabilizing agent, an acid, a hygroscopic substance or the like. There may also be added a salt of metal, in general all those admixtures which are commonly used in the diazo-type process.

The following examples serve to illustrate my invention but they are not intended to limit it thereto:

1. A mixture of 1.5 g. of the diazo compound from the 1-diethylamino-4-aminobenzene-3-sulfonic acid, 2 g. of phloroglucin, 0.5 g. of resorcin, 30 g. of tartaric acid, 40 g. of boric acid, 60 g. of diphenylguanidine in hydrochloric solution is dissolved in 1000 cc. of water. The resulting solution is applied on a base, for instance on paper. After drying, exposing to light and developing, there is obtained a black copy of excellent fastness to water.

2. By substituting the ortho-tolyl-derivative for the diphenylguanidine (referred to in Example 1) a similar result is obtained. The quantitative proportions indicated in the examples may be modified in various manner.

3. A mixture of 2 g. of the diazo compound from the 1-dimethylamino-4-amino-3-benzoic acid, 2 g. of phloroglucin, 50 g. of phenylbiguanidine

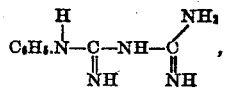

30 g. of tartaric acid, and 40 g. of boric acid is dissolved and made up to 1000 cc.

This solution is applied on a base, for instance on paper. After drying, exposing to light and developing, there is obtained a black copy of good fastness to water.

4. A mixture of 1.5 g. of the diazo compound from the diethylamino-4-amino-3-benzene sulfonic acid, 2 g. of phloroglucin, 0.5 g. of resorcin and 40 g. of 2-naphthylbiguanidine

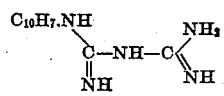

are dissolved in 1000 cc. of water.

5 cc. of concentrated hydrochloric acid are added to the said solution which is then applied on a base. After drying, exposing to light and developing there is obtained a black copy of good fastness to water. The same result is obtained even if not strictly observing the quantitative proportions indicated in the examples. There may, of course, also be used instead of the free aryl biguanidine the salts thereof.

5. A mixture of 1.5 g. of the diazo compound from dimethylamino-4-amino-3-benzene sulfonic acid, 2 g. of phloroglucin, 0.5 g. of resorcin, 70 g. of 4-chloro-2-tolyl-biguanidine, 40 g. of boric acid and 30 g. of tartaric acid is dissolved in 1000 cc. of water. 10 cc. of concentrated hydrochloric acid are added to this solution which is then applied on a base. After drying, exposing to light and developing, there is obtained a black copy, which is practically fast to water.

6. A mixture of 1.5 g. of the diazo compound from dimethylamino-4-amino-3-benzene sulfonic acid, 50 g. of diphenyl-pp'-dibiguanidine (obtainable from benzidine hydrochloride with dicyandiamide), 30 g. of aluminium sulfate, 2 g. of phloroglucin and tartaric acid and boric acid in approximately the same quantities as those indicated in Example 5 is dissolved in 1000 cc. of water to which 10 cc. of concentrated hydrochloric acid are added. After having carried out the further operations as above indicated there is obtained a blackish blue copy of very good fastness to water.

7. By substituting in Example 4 for the naphthylbiguanidine 70 g. of 4-aminophenyl-1-phenylbiguanidine (obtainable from the hydrochloride of para-aminodiphenylamine and dicyandiamide) there is also obtained in the above indicated way, a copy of good fastness to water.

I claim:

1. Process of improving the resistance of diazo-types to water which consists in incorporating into the layers aryl derivatives of guanidine.

2. Process of improving the resistance of diazo-types to water which consists in incorporating into the layers compounds of the following formula:

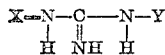

wherein X stands for an aryl residue and Y stands for H the group

or an aryl residue.

3. Process of improving the resistance of diazo-types to water which consists in incorporating into the layers compounds of the following formula:

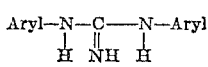

4. Process of improving the resistance of diazo-types to water which consists in incorporating into the layers compounds of the following formula:

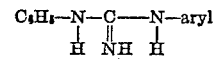

5. Process of improving the resistance of diazo-types to water which consists in incorporating into the layers compounds of the following formula:

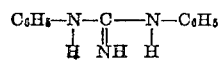

In testimony whereof, I affix my signature.

EDUARD SPRÖNGERTS.